Sept. 20, 1966   S. G. WOODWARD   3,273,590
PRESSURE RESPONSIVE VALVE HAVING A UNIFORMLY PROGRESSIVE
AND SMOOTH OPENING CHARACTERISTIC
Filed June 4, 1964
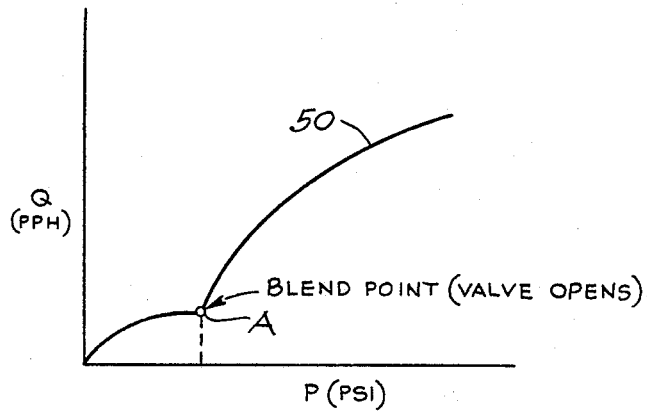
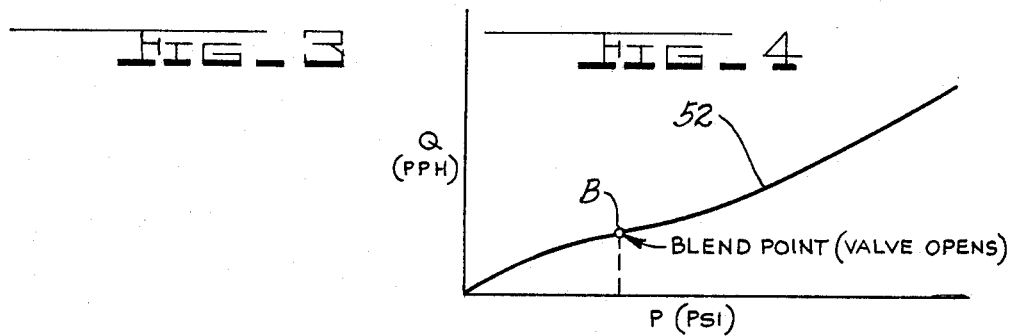
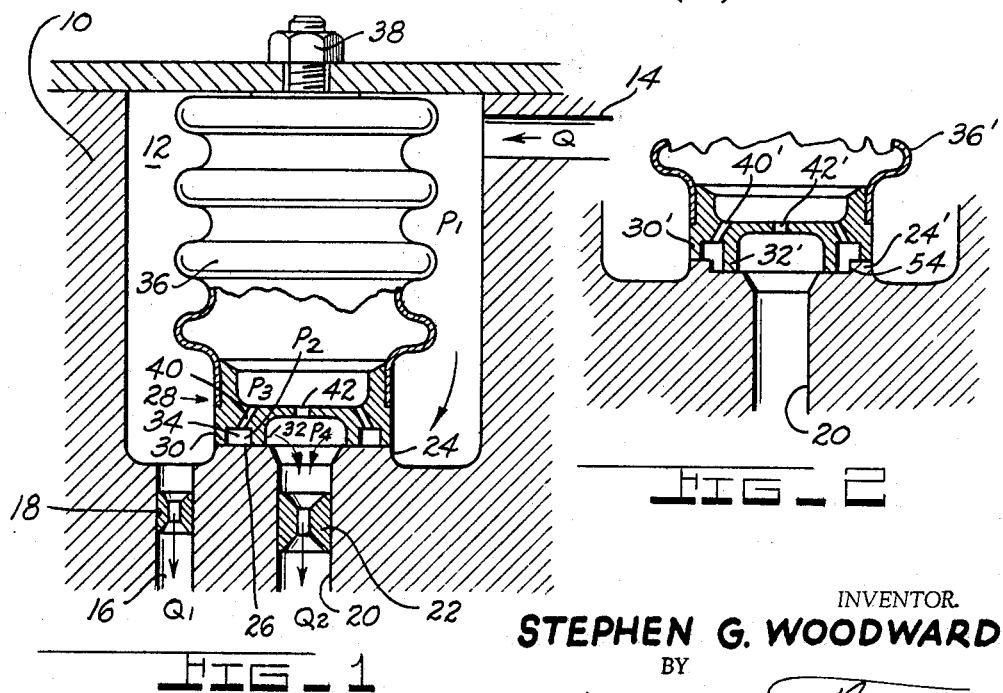
INVENTOR.
STEPHEN G. WOODWARD.
BY
William G. Thompson
ATTORNEY.

United States Patent Office 3,273,590
Patented Sept. 20, 1966

3,273,590
PRESSURE RESPONSIVE VALVE HAVING A UNIFORMLY PROGRESSIVE AND SMOOTH OPENING CHARACTERISTIC
Stephen G. Woodward, Elmira, N.Y., assignor to The Bendix Corporation, Elmira, N.Y., a corporation of Delaware
Filed June 4, 1964, Ser. No. 372,500
4 Claims. (Cl. 137—510)

The present invention relates to a pressure responsive valve such as may be utilized in a fluid flow divider, relief valve or the like, wherein it is desired to have uniformly a progressive and smooth valve opening characteristic.

It is an object of the present invention to provide a pressure responsive valve member having fluid pressure feedback means for controlling valve opening movement.

It is another object of the present invention to provide a valve member having radially spaced valve lands defining an intermediate annular recess which schedules a feedback fluid pressure opposing valve opening movement.

Other objects and advantages of the present invention will become apparent on consideration of the accompanying description and appended drawings wherein:

FIGURE 1 is a schematic drawing partly in section of a preferred embodiment of my pressure responsive valve utilized in a flow dividing system;

FIGURE 2 is a partial schematic of a modified form of my valve;

FIGURE 3 is a curve illustrating frame functional characteristics of prior art pressure valves for comparison purposes; and, FIGURE 4 is another curve showing some functional characteristics of a pressure responsive valve embodying the principles of the present invention.

Referring to FIGURE 1, numeral 10 designates a housing which forms an interior fluid receiving chamber 12. An inlet fluid supply conduit 14 is connected to housing 10 and chamber 12 to supply inlet fluid at rate Q and pressure $P_1$ from any suitable source, not shown. A primary outlet conduit 16 having a flow restriction 18 is formed in housing 10 and is in fluid communication with chamber 12 and transmits fluid at rate $Q_1$. A secondary outlet conduit 20 having a flow restriction 22 is connected generally centrally of a raised circular boss 24 formed in the lower end wall of housing 10 and transmits fluid at rate $Q_2$. Boss 24 has an upper annular surface defining an annular valve seat 26.

Abutting valve seat 26, there is arranged a moveable valve member generally designated by numeral 28 normally blocking fluid flow from chamber 12 to secondary outlet conduit 20 ($Q_2=0$). The surface of valve member 28 abutting seat 26 has formed thereon outer and inner annular valve lands or projections 30 and 32 respectively. The valve lands are radially spaced to form an intermediate annular recess 34.

Valve member 28 has a generally cylindrical, radially-outer surface which is adapted to be directly secured as by brazing or the like to the free or moveable end of bellows member 36 which has its opposite end fixedly secured to one wall of housing 10 by means of the bolt and stud connection 38. Thus, the valve member 28 serves to enclose the bellows interior, except for the controlled fluid passages to be subsequently described.

A series of drilled passages 40 are formed through a wall of valve member 28 fluidly interconnecting annular recess 34 with the interior of bellows 36. A fixed restrictive passage 42 is formed in the wall of valve 28 interconnecting the bellows interior with secondary outlet conduit 20. It will be observed that the flow circuit from recess 34, passages 40, the interior of bellows 36, passage 42 to conduit 20 is a parallel flow circuit around the inner valve land 32, thus providing a limited fluid flow which maintains the fluid pressure within the bellows to a value varying with that in recess 34 intermediate the valve lands. When valve 28 is opened, a first pressure drop exists across outer valve land 30 and fluid pressure in annular recess 34 is designated $P_2$ which is lower than $P_1$. Fluid pressure in the interior of bellows 36 is designated $P_3$ while that in secondary outlet conduit 20 is designated $P_4$. $P_3$ is an intermediate pressure valve compared to $P_2$ and $P_4$ due to the pressure drops across restrictions 40 and 42 respectively.

*Operation*

When installed, bellows 36 is compressed slightly from its free height to provide a preload on valve 28 maintaining the valve in a normally closed position. If desired, the preload may be aided by spring means if the natural bellows spring rate is insufficient for a specific design condition.

For low flow rates of inlet supply fluid Q, the pressure $P_1$ in chamber 12 is insufficient to overcome the preload force acting on valve 28 and the total flow passes out primary outlet conduit 16 ($Q_1=Q$). As the inlet fluid Q increases, the pressure $P_1$ in chamber 12 increases progressively due to the restrictive effect of restriction 18 which is representative of any line restriction in primary outlet conduit 16 such as a fluid nozzle or the like. As the pressure in chamber 12 continues to increase, it will attain a value sufficient to overcome the preload force and cause bellows 36 to contract, moving valve 28 away from seat 26. With the valve 28 spaced slightly from its seat, a slight flow will occur past the valve lands 30 and 32 to the secondary outlet conduit 20, establishing a $P_1$–$P_2$ pressure drop across land 30 and a $P_2$–$P_4$ pressure drop across land 32.

There exists a normal dumping tendency in prior art pressure responsive valves which is illustrated functionally by the curve 50 of FIGURE 3 which is a plot of total flow Q vs. $P_1$ pressure. At the valve opening or blend point A, a sudden surge of fluid or increase in the flow rate Q exists, particularly for large flow area valves. It is desired instead, by utilizing the present invention, to obtain a gradual and smooth valve opening characteristic as illustrated in the curve 52 of FIGURE 4, whereby after the valve opening or blend point B, the flow vs. pressure characteristic is not substantially altered.

The slow opening characteristic is obtained by fluidly connecting annular recess 34 to the bellows interior whereby a feedback fluid pressure $P_3$ is supplied to the bellows interior to oppose $P_1$ pressure acting on the bellows exterior and thus oppose valve opening movement. The small restriction 42 assures continuous flow so that $P_3$ pressure will quickly respond to variations in $P_2$ pressure in annular chamber 26.

Referring to FIGURE 2, there is shown a modification of my invention wherein the first outlet conduit 16 has been eliminated to illustrate the fact that my invention is not confined to flow divider mechanism, but may also be used with advantage as a pressure relief or pressurizing valve when a slow opening characteristic is desired. A further distinction of the FIGURE 2 embodiment is that the valve lands 30' and 32' are not concentric but rest on valve seat 24' having a stepped shoulder 54. Thus, each valve land may be construed to have an axially different length providing the valve seat is designed complementarily.

One of the more important advantages of my device is the ability to provide a slow opening characteristic without the necessity of utilizing a high rate spring to oppose bellows movement.

The valve opening or cracking point is established by a force balance between the amount of set deflection or preload in the bellows (and supplementary low rate springs if desired) and the pressure differential acting upon the bellows area. This pressure differential is modified by the opening action of the valve; however, so that travel behavior after opening will follow this new differential. Thus, closed, the valve is held under effectively low rate conditions, but immediately upon opening, higher rate conditions prevail so that slow opening is achieved without the accompanying setting difficulties of a high rate spring.

While the invention has been described with reference to two specific embodiments, these are illustrative of the invention and not restrictive thereof. Adaptations and modifications to the present invention may be made without departing from the scope or spirit of the present invention as defined in the following claims.

I claim:

1. A fluid pressure responsive valve device comprising: a housing member having walls defining a fluid chamber, a fluid supply conduit connected to said housing for supplying an input fluid flow to said fluid chamber, a fluid outlet conduit connected to said housing, a valve member disposed within said fluid chamber for controlling fluid flow from said fluid chamber to said outlet conduit, said valve member having first and second annular radially-spaced valve lands forming an intermediate annular valve chamber therebetween, a bellows member having a first end fixedly secured to said housing, said bellows having a second free end connected to said valve member, first passage means formed in said valve member, fluidly connecting said annular valve chamber and the interior of said bellows, second passage means fluidly connecting said fluid outlet conduit and the interior of said bellows.

2. A fluid pressure responsive valve device comprising: a housing member having walls defining a fluid chamber, a fluid supply conduit connected to said housing for supplying an input fluid flow to said fluid chamber, an annular valve seat formed in said housing on one wall thereof within said fluid chamber, a fluid outlet conduit connected to said housing having an opening formed centrally of said annular valve seat, a valve member having first and second annular radially-spaced valve lands forming an intermediate annular valve chamber therebetween, said valve member disposed in said fluid chamber with said first and second valve lands in normally abutting relationship with said annular valve seat, a bellows member having a first end fixedly secured to said housing, said bellows having a second free end connected to said valve member, first passage means formed in said valve member fluidly connecting said annular valve chamber and the interior of said bellows, second passage means fluidly connecting said fluid outlet conduit and the interior of said bellows.

3. A fluid pressure responsive valve device as claimed in claim 2 wherein said second passage means is a smaller restriction than said first passage means.

4. A fluid pressure responsive flow divider comprising: a housing member having walls defining a fluid chamber, a fluid supply conduit connected to said housing for supplying an input fluid flow to said fluid chamber, a first fluid outlet conduit connected to said housing fluidly communicating with said fluid chamber, a second fluid outlet conduit connected to said housing, a valve member disposed within said fluid chamber for controlling fluid flow from said fluid chamber to said second outlet conduit, said valve member having first and second annular radially-spaced valve lands forming an intermediate annular valve chamber therebetween, a bellows member having a first end fixedly secured to said housing, said bellows having a second free end connected to said valve member, and first passage means formed in said valve member fluidly connecting said annular valve chamber and the interior of said bellows, second passage means fluidly connecting said secondary fluid outlet conduit and the interior of said bellows.

No references cited.

WILLIAM F. O'DEA, *Primary Examiner.*

H. WEAKLEY, *Assistant Exaimner.*